(12) United States Patent
Chuang

(10) Patent No.: US 7,096,480 B2
(45) Date of Patent: Aug. 22, 2006

(54) DATA STORAGE DISK CAPABLE OF LIMITING EXTENSION OF CRACK

(75) Inventor: Cheng-Chieh Chuang, Taipei (TW)

(73) Assignee: BenQ Corporation, (TW)

( * ) Notice: Subject to any disclaimer, the term of this patent is extended or adjusted under 35 U.S.C. 154(b) by 243 days.

(21) Appl. No.: 10/716,446

(22) Filed: Nov. 20, 2003

(65) Prior Publication Data

US 2004/0103423 A1    May 27, 2004

(30) Foreign Application Priority Data

Nov. 22, 2002    (TW) ............................... 91134056 A

(51) Int. Cl.
*G11B 7/24*    (2006.01)
(52) U.S. Cl. ..................................................... 720/721
(58) Field of Classification Search ................ 720/721, 720/718; 369/282
See application file for complete search history.

(56) References Cited

U.S. PATENT DOCUMENTS

| | | | | |
|---|---|---|---|---|
| 5,999,513 A | * | 12/1999 | Arakawa et al. | 369/282 |
| 2002/0054566 A1 | * | 5/2002 | Netsu et al. | 369/291 |
| 2002/0075794 A1 | | 6/2002 | Park | 369/282 |

* cited by examiner

*Primary Examiner*—David Davis
(74) *Attorney, Agent, or Firm*—Michael Bednarek; Pillsbury Winthrop Shaw Pittman LLP

(57) ABSTRACT

A data storage disk capable of limiting a crack from extending during operation is provided. The data storage disk has a center, an outer edge, an inner edge, and at least one slot. The slot is disposed between the outer edge and the inner edge. When a crack occurs in the disk, the slot disperses a stress which forces the crack to extend. Therefore, the slot hinders extension of the crack to prevent the disk from break.

18 Claims, 5 Drawing Sheets

US 7,096,480 B2

DATA STORAGE DISK CAPABLE OF LIMITING EXTENSION OF CRACK

CROSS REFERENCE TO RELATED APPLICATIONS

This application claims priority to Taiwan Patent Application No. 091134056 entitled "Anti-Crack Data Storage Disk", filed Nov. 22, 2002.

FIELD OF INVENTION

The present invention generally relates to a data storage disk, and more particularly, to a data storage disk capable of limiting breakage caused by a crack during operation in a disk driver.

BACKGROUND OF THE INVENTION

Recently, the revolution per minute (RPM) of a spindle motor in a disk driver has been continuously increased due to the increase of information-recording density of the data storage disk. However, problems regarding the high-speed spin of the data storage disk have been exposed, for example, the increase in breakage of the disk during operation, and most seriously, injuries caused by cracked disks flying out of the disk driver. Therefore, to design a disk capable of limiting breakage is the focus of development in the industry.

FIG. 1 illustrates a conventional disk. It is known by those skilled in the art that when the disk spins at a high speed, the disk has a highest stress in the inner edge 103. Therefore, a crack is generally generated on the inner edge and advances to the outer edge 101.

When the crack generated in the disk reaches the critical crack length, the advance of the crack increases substantially to make the disk break. It is also known that as the spin speed increases the critical crack length decreases.

The commercial high-speed disk driver generally has a speed of 48× or 52×. According to David Nowell's experiments and theory, when the speed is 48×, the critical crack length is about 1.72 cm; when calculating by the destructive mechanics, the theoretical critical crack length becomes about 0.83 cm, which is about one half of the experimental value. When the speed is 52×, the experimental critical crack length is about 1.25 cm, and the theoretical critical crack length is about 0.6 cm, which is about one half of the experimental value. The factors of differences between experimental and theoretical values have been discussed in David Nowell's article and will not be elaborated herein.

Therefore, there is a need to provide a disk suitable for operating at a high spin speed and capable of hindering a crack from advancing over the experimental critical crack length.

SUMMARY OF THE INVENTION

It is one aspect of the present invention to provide a data storage disk capable of limiting breakage caused by a crack during operation in a disk driver.

It is another aspect of the present invention to provide a data storage disk suitable for use in a high-speed disk driver.

In an exemplary embodiment, the present invention provides a data storage disk having a gravity center, an outer edge, an inner edge, and at least one slot disposed between the outer edge and the inner edge. When a crack occurs in the data storage disk, the slot disperses a stress which forces the crack to extend. Therefore, the slot hinders an extension to the crack from extending to the outer edge so as to keep the crack under the critical crack length and prevent breakage of the disk.

The data storage disk further includes a data storage region for recording information. The data storage region is arranged between the outer edge and the inner edge, and the slot is disposed between the data storage region and the inner edge.

In one embodiment, multiple slots are formed on the data storage disk. A geometry center of these slots coincides with the gravity center of the data storage disk. Furthermore, the slots is thus configured that a straight normal line drawn from the center toward any point at the outer edge intersects with at least one of the slots. Therefore, a crack generated on the inner edge is effectively hindered from advancing to the outer edge.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE INVENTION

The present invention provides a data storage disk 100, which is capable of limiting breakage caused by a crack during operation in a disk driver. The data storage disk 100 can be any disk for storing information, such as video compact disk (VCD), digital-video-disk (DVD), mini disk, or the like.

Figure 1:
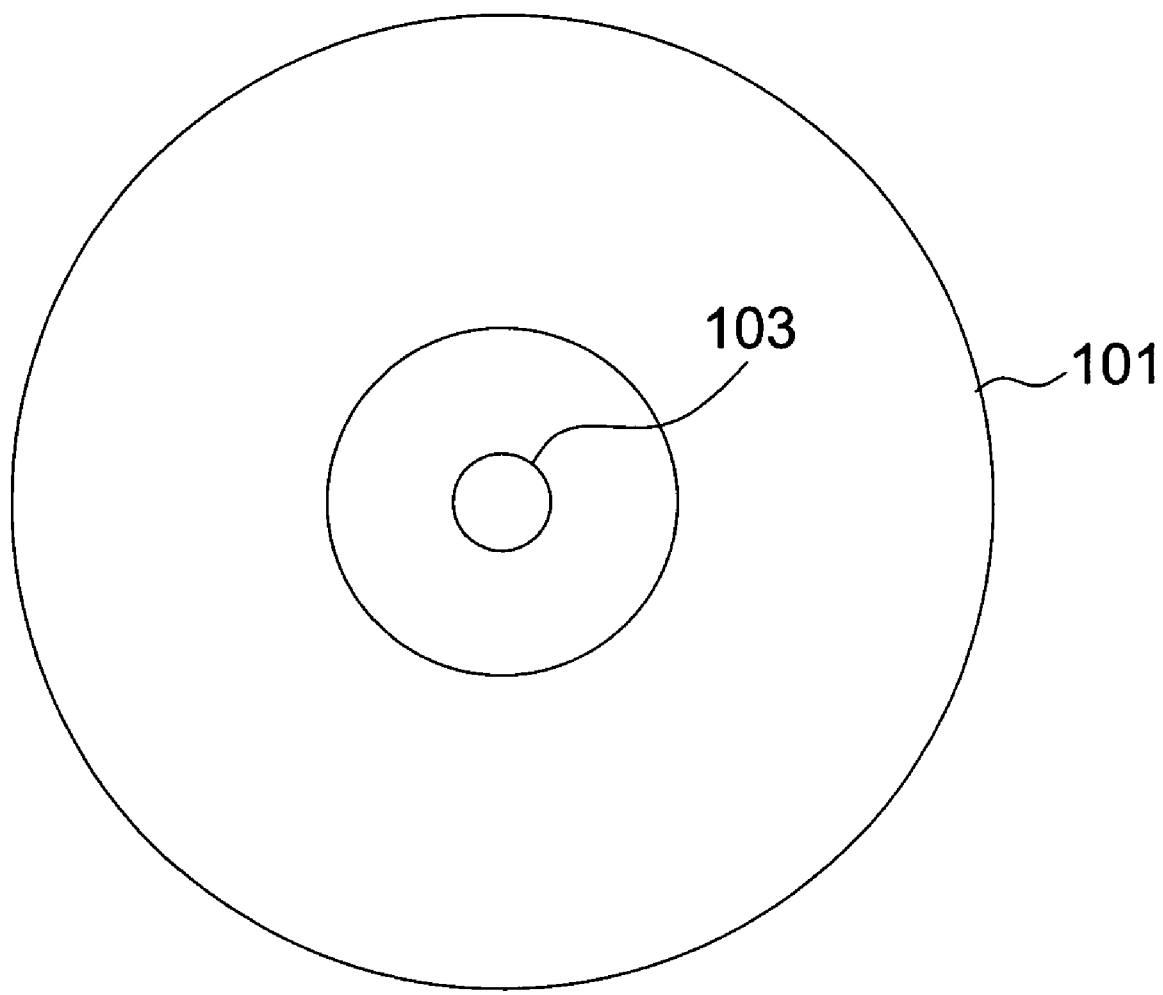
FIG. 1 illustrates a conventional data storage disk.
Figure 2A:
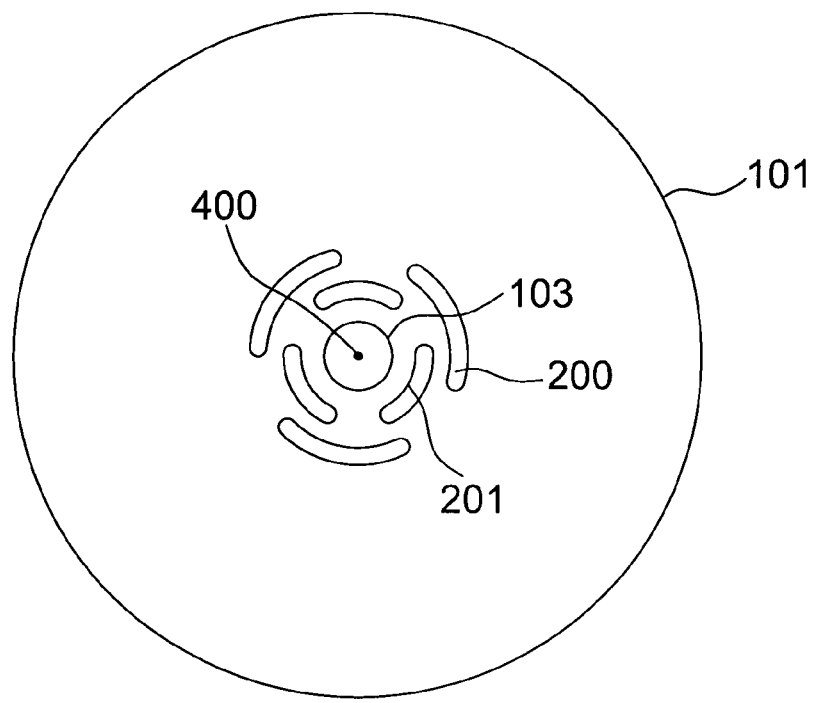
FIG. 2A illustrates a data storage disk in a first embodiment of the present invention.

FIG. 2A illustrates an exemplary data storage disk 100 of the present invention. As shown in FIG. 2A, the data storage disk 100 has a center 400, an outer edge 101, an inner edge 103, and at least one slot 200. The slot 200 is disposed between the outer edge 101 and the inner edge 103. In a preferred embodiment, the maximum distance "d" (not shown) between one of the slots 200 and the inner edge 103 is less than 1.25 cm.

Figure 2B:
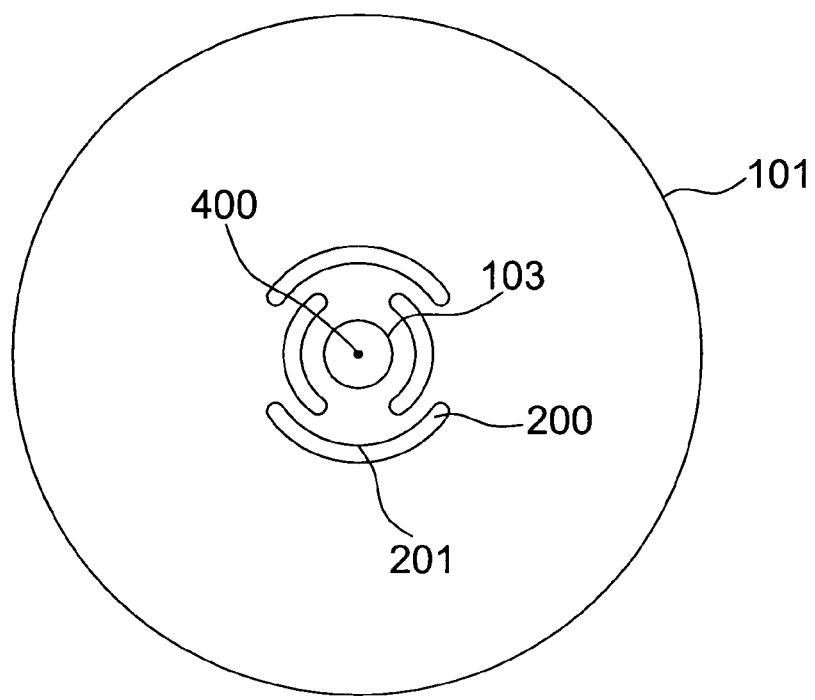
FIG. 2B illustrates a data storage disk in a second embodiment of the present invention.

It is noted that though six slots 200 are shown in FIG. 2A, the number of slots 200 is not limited thereto. For example, four slots 200 are illustrated in FIG. 2B.

As shown in FIG. 2A, the slot 200 defines an inner rim 201 of a smooth close loop. In other words, the inner rim 201 has no angled or sharp point so as to prevent stress from concentrating on the point where a crack might be induced when a force is exerted on the data storage disk 100.

When a crack occurs in the data storage disk 100, it generally advances toward the outer edge 101. When the crack advances to the slot 200, the stress of forcing the crack to advance is dispersed to the inner rim 201 of the slot 200. In other words, the slot 200 effectively hinders further extension of the crack and keeps the crack under the critical crack length so as to prevent breakage of the disk 100.

When the data storage disk 100 is operated, the crack is generally generated on the inner edge 103 and advances toward the outer edge 101 because the stress is higher around the inner edge 103. In a preferred embodiment, the maximum distance "d" between one of the slots 200 and the inner edge 103 is less than 1.25 cm to ensure that the crack remains under the critical crack length when spinning under a high speed, such as 52×.

Figure 3A:
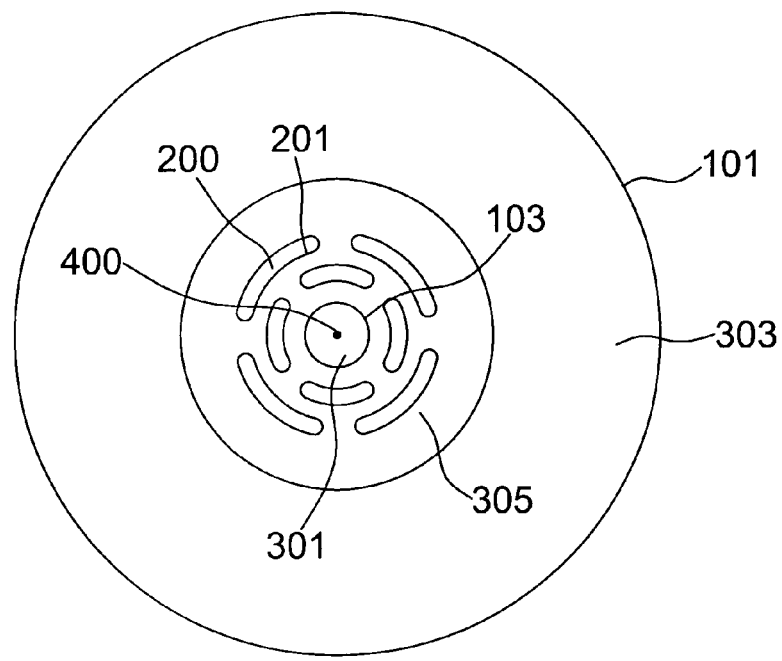
FIG. 3A illustrates exemplary slots disposed between the data storage region and the inner edge.
Figure 3B:
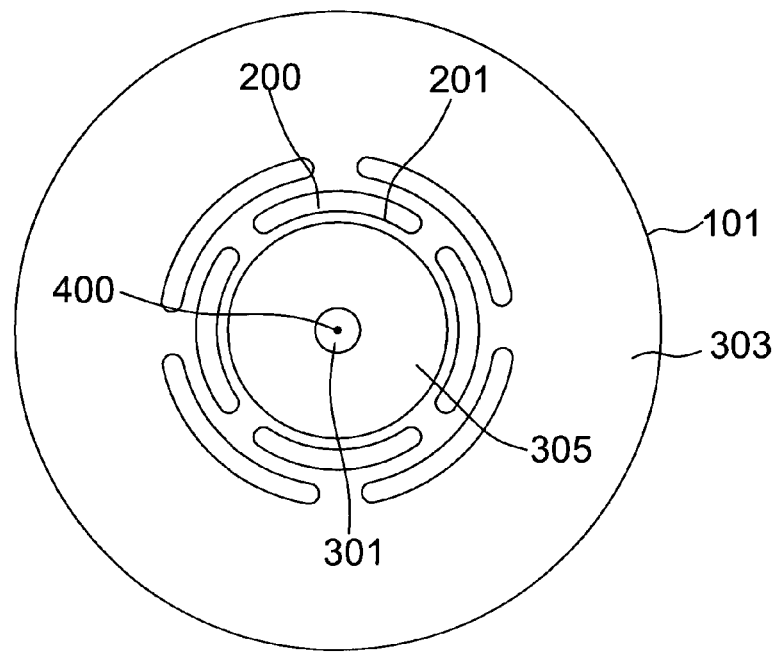
FIG. 3B illustrates exemplary slots disposed in the data storage region.
Figure 3C:
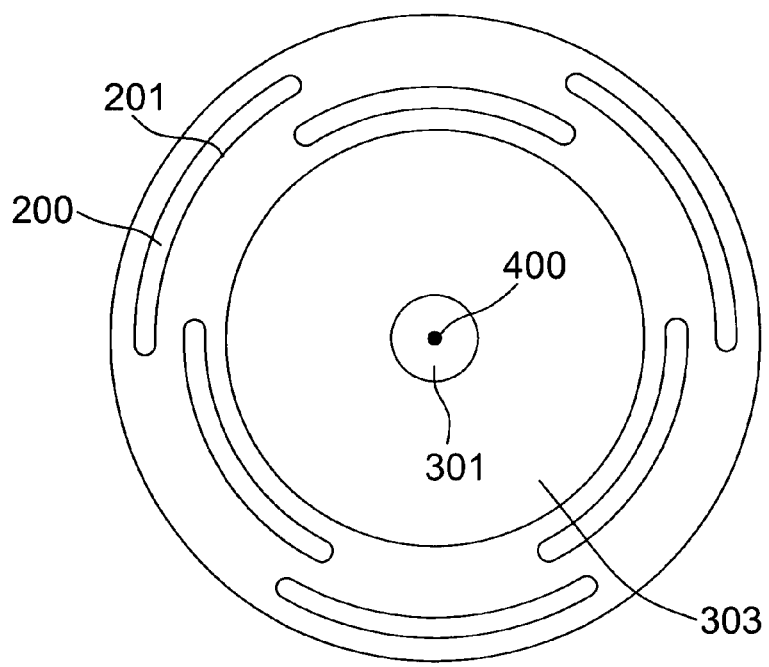
FIG. 3C illustrates exemplary slots disposed between the data storage region and the outer edge.

As shown in FIG. 3A, the data storage disk 100 further includes a data storage region 303 for storing data. The data storage region 303 is arranged between the outer edge 101 and the inner edge 103. In this embodiment, the slot 200 is disposed between the data storage region 303 and the inner edge 103. In other embodiments, the slot 200 can be disposed within the data storage region 302 or between the data storage region 303 and the outer edge 101, as shown in FIGS. 3B and 3C, respectively.

As shown in FIG. 3A, the exemplary data storage disk also includes a center hollow portion 301 and a non-recording portion 305. The center hollow portion 301 surrounded by the inner edge 103 is a hole around the center 400 of the disk. The data storage disk 100 engages with the disk driver by a spindle passing through the center hollow portion 301. In this embodiment, the center hollow portion 301 is a hole in a round shape; however, the center hollow portion can be in other shapes such as square, oval, or the like, and is not limited thereto.

The non-recording portion 305 is disposed between the center hollow portion 301 and the data storage region 303. The disk driver holds the non-recording portion 305 so as to provide a driving force for spinning the data storage disk 100. The slot can be disposed in the non-recording portion 305 and hinder the crack from advancing to the outer edge 101 so as to prevent the breakage of the data storage disk 100.

Figure 4:
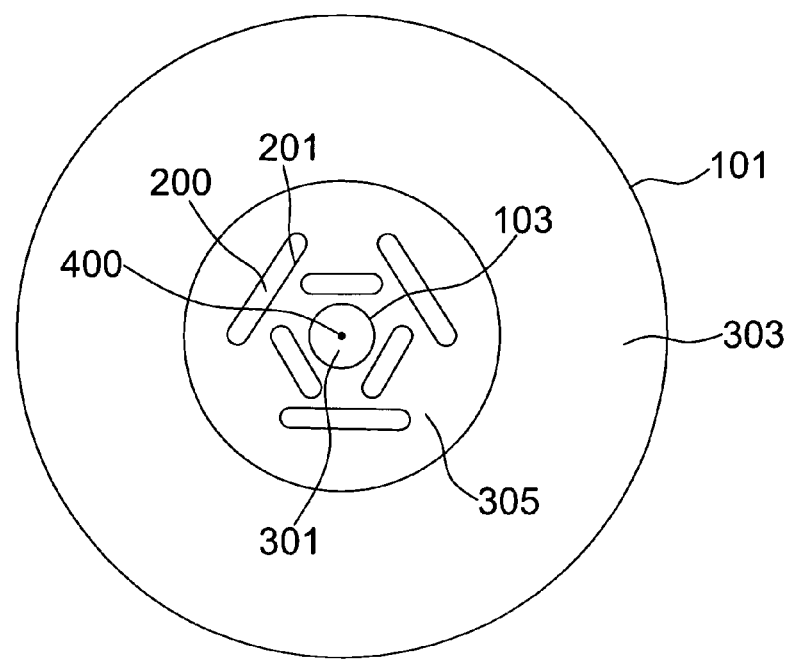
FIG. 4 illustrates a data storage disk in a third embodiment of the present invention.

As shown from FIG. 2A to FIG. 3B, the slot is in a curved shape. Multiple slots 200 are disposed circumferentially around the center 400 of the data storage disk 100. In such arrangement, the slots 200 are arranged around the center 400 in a configuration similar to the rotation direction of the data storage disk 100. However, in other embodiments, the slots 200 can be in a different shape, for example, in bar shape as shown in FIG. 4.

As shown from FIG. 2A to FIG. 3B, the data storage disk 100 has a center 400, and the center 400 can be the center of mass, center of rotation, center of geometry, or other physically or geometrically defined center. The slots 200 are in a curved shape, and the center of the slots 200 is coincided with the center 400 of the data storage disk 100 as shown from FIG. 2A to FIG. 4.

Figure 5:
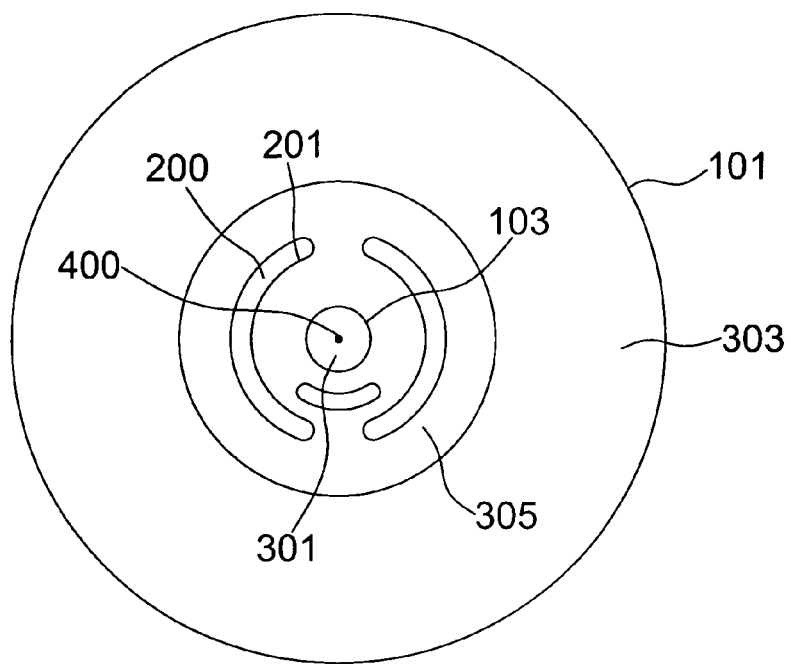
FIG. 5 illustrates a data storage disk in a fourth embodiment of the present invention.
Figure 6:
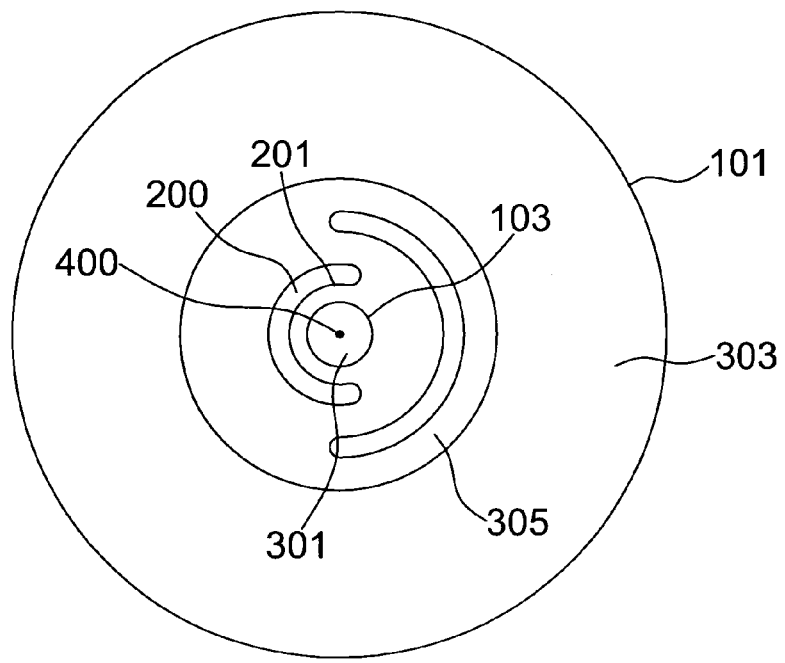
FIG. 6 illustrates a data storage disk in a fifth embodiment of the present invention.

In addition, the slots 200 can be asymmetrically disposed around the center 400 as shown in FIGS. 5 and 6. It is noted that the center of geometry of slots 200 is not required to coincide with the center 400 of the data storage disk 100. As shown in FIG. 6, the center of geometry of slots 200 does not coincide with the center 400 of the data storage disk 100. By adjusting the center of gravity of the data storage disk 100, it still can maintain the balance when spinning at a high speed.

As shown from FIG. 2A to FIG. 3B, a straight normal line drawn from the center 400 or any point at the inner edge 103 toward any point at the outer edge 101 intersects with at least one of the slots 200. In such arrangement, the slots 200 can effectively hinder most cracks generated on the inner edge 103 from advancing to the outer edge 101.

Although specific embodiments have been illustrated and described, it will be obvious to those skilled in the art that various modifications may be made without departing from what is intended to be limited solely by the appended claims.

What is claimed is:

1. A data storage disk having a center, comprising:
    a data storage portion between an outer edge and an intermediate boundary;
    a non-recording portion between said intermediate boundary and an inner edge; and
    at least one slot disposed between said intermediate boundary and said inner edge;
    wherein said slot hinders an extension to a crack occurred in said data storage disk and wherein a distance between an inner sidewall of said slot and the center of the data storage disk is larger than the radius of said inner edge.

2. The data storage disk of claim 1, wherein said slot is in a curved shape, and a distance between a outer sidewall of said slot and the center of the data storage disk is smaller than the radius of said intermediate boundary.

3. The data storage disk of claim 2, wherein said slot is disposed circumferentially around the center of said data storage disk.

4. The data storage disk of claim 1, further comprising a plurality of slots, wherein a geometrically center of said slots is coincided with the center of said data storage disk.

5. The data storage disk of claim 4, wherein a straight normal line drawn from the center toward any point at said outer edge intersects with one of said slots.

6. The data storage disk of claim 1, wherein said slot has an inner rim of a smooth close loop.

7. The data storage disk of claim 1, wherein a distance defined between said slot and said inner edge is substantially less than 1.25 cm.

8. A data storage disk, comprising:
    a center hollow portion;
    a data storage portion between an outer edge and an intermediate boundary;
    a non-recording portion disposed between said center hollow portion and said data storage portion; and
    at least one slot disposed in said non-recording portion;
    wherein said slot hinders an extension to a crack occurred in said data storage disk, and
    wherein a distance between an inner sidewall of said slot and the center of the data storage disk is larger than the radius of said inner edge, and a distance between an outer sidewall of said slot and the center of the data storage disk is smaller than the radius of said intermediate boundary.

9. The data storage disk of claim 8, wherein a distance between said slot and said data storage portion is substantially less than 1.25 cm.

10. The data storage disk of claim 8, wherein said slot is disposed circumferentially around said center hollow portion.

11. A data storage disk having a center, comprising:
    an outer edge;
    an inner edge;
    a data storage region disposed between said outer edge and an intermediate boundary; and
    at least one slot disposed between said data storage region and said inner edge;

wherein said slot hinders an extension to said crack occurred in said data storage disk, and wherein a distance between an inner sidewall of said slot and the center of the data storage disk is larger than the radius of said inner edge, and a distance between a outer sidewall of said slot and the center of the data storage disk is smaller than the radius of said intermediate boundary.

12. The data storage disk of claim 11, wherein said slot is in a curved shape.

13. The data storage disk of claim 12, wherein said slot is disposed circumferentially around the center of said data storage disk.

14. The data storage disk of claim 11, further comprising a plurality of slots, wherein said data storage disk has a center and a geometrically center of said slots is coincided with the center of said data storage disk.

15. The data storage disk of claim 14, wherein a straight normal line drawn from the center toward any point at said outer edge intersects with one of said slots.

16. The data storage disk of claim 11, wherein said slot has an inner rim of a smooth close loop.

17. The data storage disk of claim 11, wherein a first distance defined between said slot and said inner edge is substantially less than 1.25 cm.

18. The data storage disk of claim 11, wherein a second distance defined between said slot and said data storage region is substantially less than 1.25 cm.

* * * * *